United States Patent [19]
Kojima

[11] 4,218,322
[45] Aug. 19, 1980

[54] WATER FILTRATION APPARATUS
[75] Inventor: Sadao Kojima, Hachiogi, Japan
[73] Assignee: Kosaku Iida, Tokyo, Japan
[21] Appl. No.: 660,441
[22] Filed: Feb. 23, 1976
[30] Foreign Application Priority Data
  Apr. 11, 1975 [JP] Japan ................... 50-44485
[51] Int. Cl.² ............................................ B01D 33/10
[52] U.S. Cl. ..................... 210/391; 210/402
[58] Field of Search ............... 210/402, 407, 427, 77, 210/79, 505, 507–509, 500 R, 391

[56] References Cited
U.S. PATENT DOCUMENTS

| | | | |
|---|---|---|---|
| 2,383,066 | 8/1945 | McDermott | 210/402 X |
| 3,062,379 | 11/1962 | Bryan | 210/500 R X |
| 3,617,556 | 11/1971 | Cole et al. | 210/402 X |
| 3,707,230 | 12/1972 | Davidson | 210/77 |
| 3,747,770 | 7/1973 | Zentis | 210/402 |

Primary Examiner—William A. Cuchlinski, Jr.

[57] ABSTRACT

An apparatus for filtering raw water comprising a drum composed of disc-shaped end plates, horizontal member or members extended between the peripheries of the end plates, and a water-permeable filter cloth with a long pile stretched round the member or members to form a drum-shaped filter body. A rotating shaft supports the drum and the drum is submerged in a raw water conduit. A discharge pipe communicates with the inside of the drum. A hopper is located immediately below the filter body in the conduit and carries a pair of rolls on its upper edges for contact with the filter body. A drain pipe is connected to the hopper. The arrangement permits efficient removal of minute floating and drifting matter, such as plankton, from raw water, making possible a high rate of filtration with a very small space requirement.

10 Claims, 2 Drawing Figures

WATER FILTRATION APPARATUS

BACKGROUND OF THE INVENTION

This invention relates to an apparatus for continuously filtering raw water.

The growth of plankton will usually bring difficulties in the supply of tap water and even of industrial water, and therefore some preventive measure is necessary. To attain this end, a variety of methods are in use, including inhibition of algae growth in a bio-ecological way, control of the propagation of plankton by chemicals, and removal of plankton by settling or by filtration. In any case, filtration must be resorted to if plankton is to be removed positively and efficiently. Among known filtration processes are slow and rapid-sand filtration, double filtration, and a process using a micro-strainer. Of these, the one that requires the least space and accomplishes filtration in the most efficient way is the last-mentioned method relying upon a micro-strainer. The method is carried into practice with an apparatus in which a fine-mesh screen of stainless steel is rolled to form a drum-shaped filter body. The body is rotatably supported by a hollow shaft. A hopper is located immovably and opposite to the rotating shaft in the upper space of the filter body. The rotating shaft is held horizontally on the water way in such a manner that the filter body is submerged in water up to about two-fifths of its height. Above the filter body, nozzles for injecting water thereinto are arranged. Altogether the components described constitute a filter equipment. In operation, the filter body is slowly rotated as raw water is being fed thereto, so that the water is filtered outwardly through the body. Floating and suspended solids left behind on the inner wall of the filter body are washed off. As they are carried upward by the rotation of the filter body, the solids are washed off by jets of water from the nozzles above the filter body. The solids are washed into the hopper, and then are discharged to the outside through the hollow shaft. The procedure is continuously repeated for the filtration of raw water. Since the filter body is under water for only about two-fifths of its height, as noted, the filtration area is limited and the washing requires the use of water under pressure. In actual filtration operations difficulties are involved in handling water that contains cyanophyta, coagulated floc, and biological floc. Moreover, the equipment is costly because of the expensive stainless steel screen employed as the filter.

The present invention has for an object the provision of a continuous rotary drum filtration apparatus capable of eliminating the foregoing problems of the last-mentioned filtration method. The construction of the apparatus is characterized in that horizontal bars, metal screen, or the like is extended between the peripheries of disc-shaped end plates to form a drum-shaped frame and a filter cloth of a water-permeable fabric with a long pile or flocked fabric is wrapped round the frame to form a hollow filter body. A rotating shaft connects the filter body with a discharge pipe and supports the filter body while it is submerged in a water conduit. A hopper is located immediately below the filter body in the conduit. The hopper carries on its upper parallel edges a pair of rolls in contact with the filter body.

DETAILED DESCRIPTION

Figure 1:
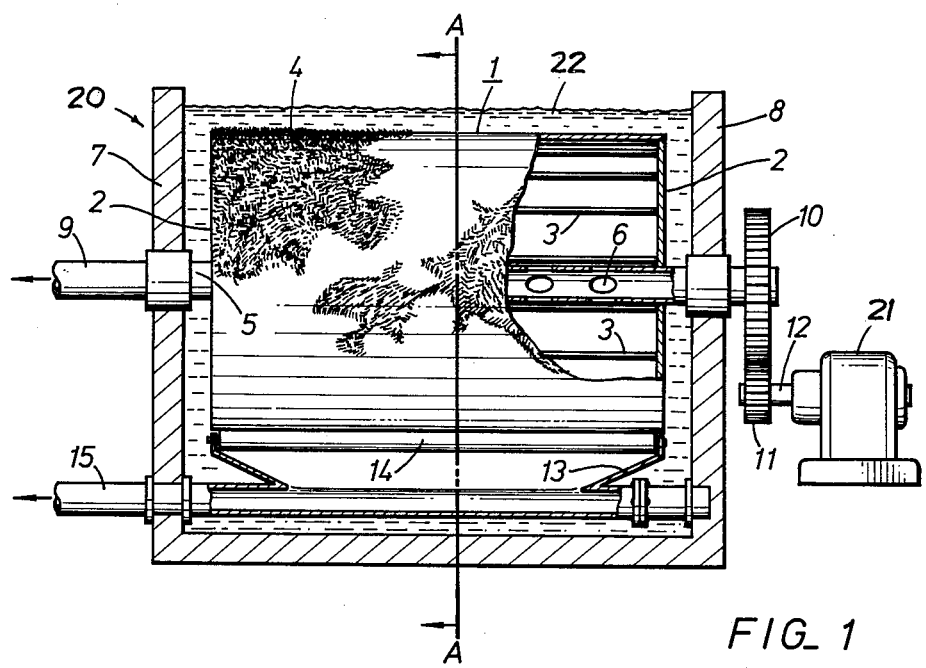
FIG. 1 is a front view of an embodiment of the invention, partly broken away to show the internal construction.
Figure 2:
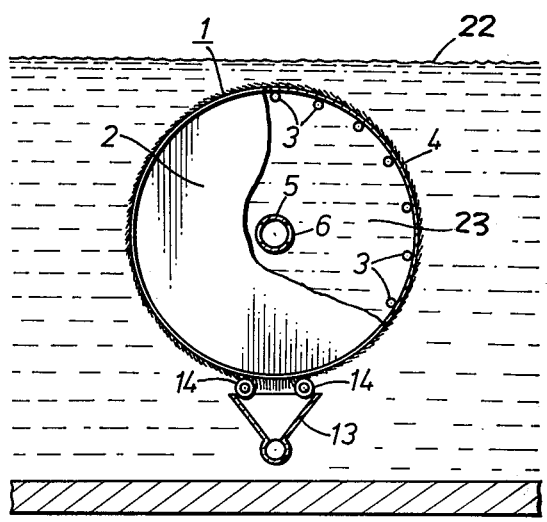
FIG. 2 is a cross-sectional view taken on the line A—A of FIG. 1.

Referring to the accompanying drawing showing the embodiment of the invention, a filter body 1 consists of two disc-shaped end plates 2, a number of bars 3 horizontally extended in a suitably spaced relationship between the peripheries of the end plates to form a drum-like frame, and a filter cloth 4 in the form of pile fabric with a pile of about 3 cm or greater in length wrapping round the drum-like frame. A hollow rotating shaft 5 is fixedly extended along the central axis of the filter body. The portion of the hollow shaft inside the filter body is formed with water holes 6. The shaft is rotatably journaled at its ends in the side walls 7 and 8 of a water conduit 20. One end of the rotating shaft 5 is connected to a fresh water discharge pipe 9 which extends through the side wall 7. A gear 10 is mounted on the other end of the shaft 5. Another gear 11 is fastened on the output shaft 12 of a motor 2, and meshes with the gear 10. A hopper 13 is disposed immediately below the filter body 1 in the conduit 20. It carries a pair of elongated rolls 14 on its parallel upper edges. Elongated rolls 14 are in rotatable contact with the filter body 1. The bottom of the hopper 13 communicates with a drain pipe 15 through the side wall 7 of the conduit 20.

With the construction described, the filtration apparatus according to the invention operates in the following way. The filter body, submerged in raw water 22, is driven by the motor 21 to filter the water inwardly while rotating at a rate of one to several revolutions per minute. Suspended solids such as plankton in water are prevented from entering the filter body by the pile layer of the filter cloth 4, while the water or filtrate deprived of such suspended matter is admitted to the inner space of the filter body and thence to the hollow shaft 5 through its holes 6. The water is then delivered via the fresh water discharge pipe 9 to its final destination. The suspended solids intercepted by the filter cloth are brought, by the rotation of the filter body 1, into the zone between the rolls 14, where they are washed off by a downward pressure exerted by the filtered water 23 from the inside of the filter body. The solids with water are collected by the hopper 13 and discharged to the outside by way of the drain pipe 15. As noted, the filter body is completely submerged and the thick pile layer formed by a mass of long cut fibers on the outer surface of the filter cloth catches and detains the floating and drifting matter, allowing only clean water to get into the filter body. Therefore, the cyanophyta, coagulated floc, biological floc, and other floating and drifting matter that have hitherto been difficult to remove by the conventional micro-strainer are now readily caught on the surface of the filter cloth 4 and easily and rapidly removed. The filter cloth is backwashed by the pressure of the clean water 23 flowing downward from the inside of the filter body toward the hopper 13. The long pile on the outer side of the portion of the filter cloth which is between the rolls 14 are thereby straightened downwardly, thus releasing the suspended solids completely therefrom into the hopper. The operation being automatically carried out by the rotation of the filter body, there is no need of additional force, hydraulic or mechanical.

Experiments were conducted with an apparatus embodying the invention to determine its capabilities of removing plankton and other floating and drifting matter from raw water. The results were as tabulated below:

| Suspended matter | In raw water | In treated water | Percent removal |
|---|---|---|---|
| Algae (No. per ml): | | | |
| Cyanophyta | 5,340 | 420 | 92% |
| Bacilariophyta | 820 | 36 | 96 |
| Chlorophyta | 1,630 | 120 | 93 |
| Activated sludge (mg/l) | 3,125 | 156 | 95 |
| Coagulated floc (mg/l) | 580 | 33 | 94 |
| Sludge (water cont. %) | 97 | 85 | 12 |

In accordance with the invention, as stated above, a filter body comprising a filter cloth of water-permeable fabric having a long pile or flocked fabric is wrapped around a frame in a drum or generally cylindrical form. The drum is mounted on a rotating shaft which communicates with a discharge pipe. The drum is completely submerged within a water conduit. Immediately below the filter body in the conduit is a hopper which is equipped with a pair of rolls on its upper edges for contact with the filter body. The hopper is connected with a drain pipe. As the filter body slowly rotates, raw water in the conduit around it is filtered inwardly, leaving suspended solids behind on the outer surface of the filter cloth in the form of a filter cake. The solids are then removed by the pressure of clean water or filtrate flowing downwardly through the filter cloth toward the hopper. The arrangement removes minute suspended matter very efficiently, removes the resulting deposit from the filter cloth and discharges it successively to the outside via the hopper. Thus, a highly efficient filtration operation can be performed continuously and automatically. Except for the motor that drives the filter body, no hydraulic or mechanical power is required. Filter cloth is readily available in the form of pile fabric or flocked fabric. These factors combine to make the apparatus of the invention low in cost. Furthermore, the apparatus embodying the invention provides a large filter area and achieves a high rate of filtration (up to about 1,000 cubic meters per day). The apparatus does not need a large space. The capacity being equal, the apparatus of this invention will require only about one-fifth of the space a sedimentation basin usually occupies for the sedimentation process.

With the foregoing features the apparatus of the invention is desirable as one for filtering raw water.

What is claimed is:

1. An apparatus for filtering raw water comprising a drum composed of a pair of disc-shaped end plates, horizontal connecting means extended between the peripheries of the end plates to permit passage of water therethrough and to form a frame, and a water-permeable filter cloth with a long pile wrapped around said frame to form a generally drum-shaped filter body, a shaft means for rotatably supporting said drum and communicating the inside of said drum with a discharge pipe, said filter body being adapted to be submerged in a raw water conduit, a hopper located below said filter body in said raw water conduit and carrying roll means on its opposite upper edges for contact with said filter body, means for directing a portion of the water in the inside of the drum to said hopper through a part of said filter cloth and a drain pipe means connected to the hopper for conveying away solids which are discharged from said filter body into said hopper.

2. An apparatus as defined in claim 1 wherein the filter cloth has a pile of not shorter than 3 cm.

3. An apparatus for filtering raw water comprising a drum composed of a pair of disc-shaped end plates, horizontal connecting means extended between the peripheries of the end plates to permit passage of water therethrough and to form a frame, and a water-permeable filter cloth with a long pile wrapped around said frame to form a generally drum-shaped filter body, a shaft means for rotatably supporting said drum and communicating the inside of said drum with a discharge pipe, said filter body being adapted to be completely submerged in a raw water conduit, a hopper located immediately below said filter body in said raw water conduit and carrying roll means on each of its upper edges for contact with said filter body, and means for backwashing said filter body including a drain pipe means connected to the hopper for creating a continuous flow of water through said filter cloth downwardly into said hopper between said roll means at a rate sufficient to cause said long pile to straighten downwardly into said hopper, whereby the flowing water conveys away solids which are discharged from said filter body into said hopper.

4. An apparatus as defined in claim 3 wherein a pressure differential of running water is produced between the hopper and the drum.

5. An apparatus as defined in claim 3 wherein the long pile of the filter cloth is suited for intercepting and detaining floating and drifting solids, such as plankton, thereon.

6. An apparatus as defined in claim 3 wherein the horizontal connecting means comprises a metal screen extended between the end plates.

7. An apparatus as defined in claim 3 wherein the filter cloth is a flocked fabric.

8. An apparatus as defined in claim 3 wherein the horizontal connecting means comprises a plurality of bars extended between the end plates.

9. An apparatus as defined in claim 3 wherein the filter cloth is a pile fabric with a long pile.

10. A continuous rotary drum filter adapted for immersion in the slurry which is to be filtered comprising:
    filter means for filtering said slurry to form a filter cake on the exterior of said filter means and to collect filtrate from the interior of said filter means, said filter means having a generally cylindrical form and being supported for rotation about its longitudinal axis, said longitudinal axis extending generally horizontally, said filter means including a filter cloth having a long pile, said long pile being at least on the exterior of said filter means, said filter cake being formed on said long pile; and
    filter cake removal means for removing said filter cake from said long pile including a hopper member extending generally parallel to said longitudinal axis below said filter means and opening upwardly towards said filter means, said removal means including at least two roller members extending generally parallel to said longitudinal axis normally in contact with said filter means, said hopper member opening upwardly between said roller members, and backwash means for directing a flow of filtrate downwardly through said filter cloth with sufficient force to straighten said long pile downwardly into said hopper member and release said filter cake into said hopper members.

* * * * *